United States Patent [19]

Smithson

[11] 4,328,588

[45] May 4, 1982

[54] SYNCHRONIZATION SYSTEM FOR DIGITAL DATA

[75] Inventor: Richard A. Smithson, Yorba Linda, Calif.

[73] Assignee: Rockwell International Corporation, El Segundo, Calif.

[21] Appl. No.: 169,583

[22] Filed: Jul. 17, 1980

[51] Int. Cl.³ .............................................. H04L 7/08
[52] U.S. Cl. ..................................... 375/106; 375/94; 375/96; 328/72; 307/269
[58] Field of Search ........................ 375/34, 106–108, 375/111, 113, 118, 119, 96, 94; 307/208, 232, 260, 269; 328/38, 55, 63, 72, 155; 364/575, 811, 733, 734

[56] References Cited

U.S. PATENT DOCUMENTS

| | | | |
|---|---|---|---|
| 3,474,342 | 10/1969 | McGee | 375/34 |
| 3,502,905 | 3/1970 | Bicking | 307/355 |
| 3,602,826 | 8/1971 | List | 307/353 |
| 3,716,780 | 2/1973 | Van Elk | 375/34 |
| 3,786,491 | 1/1974 | Carleton | 364/733 |
| 3,851,101 | 11/1974 | En et al. | 375/119 |
| 4,007,330 | 2/1977 | Winters | 375/96 |
| 4,012,598 | 3/1977 | Wiley | 375/118 |
| 4,074,073 | 2/1978 | Eidsmo | 375/119 |
| 4,088,833 | 5/1978 | Godard | 375/96 |

Primary Examiner—Benedict V. Safourek
Assistant Examiner—Stephen Chin
Attorney, Agent, or Firm—H. Fredrick Hamann; Daniel R. McGlynn

[57] ABSTRACT

A digital signal synchronization system including a digital signal source for supplying an input digital signal, and a plurality of substantially identical integrating circuits, each connected to the digital signal source for integrating the signal for a predetermined time. A plurality of clock sources are also provided, each connected to a corresponding one of the integrating circuits, so that each integrating circuit begins integrating the digital signal at a different time. Decision circuits are connected to the output of each of the integrating circuits for electing one of the integrating circuits according to a predetermined criteria.

17 Claims, 13 Drawing Figures

CLOCK TIMING

MICROPROCESSOR IMPLEMENTATION

SYNCHRONIZATION SYSTEM FOR DIGITAL DATA

The invention herein described was made in the course of or under a contract or subcontract thereunder, with the U.S. Navy.

FIELD OF THE INVENTION

The invention relates to systems for the detection and synchronization of data presented in digital waveforms, and in particular for synchronizing a digital signal with the clock timing of an incoming digital signal with noise.

BACKGROUND OF THE INVENTION

There are numerous methods for the detection and synchronization of data for use in noisy environments, and in particular techniques using integration for the detection of data in distinct state signal waveforms. One such method is presented in U.S. Pat. No. 3,864,583 which provides a pair of integration circuits forming an integrator for each state of the digital signal with the integrators being alternately actuated. In such prior art for a two-state signal, two integrators are provided with a clocking system to alternately actuate pairs of the integrators. A subsequent amplitude comparison is then used to determine the date represented by the digital signal.

Phase-lock loop techniques are used to establish data synchronization by comparing input noisy digital data with a reference clock in a phase detector. The reference clock phase is adjusted to establish a minimum phase error with respect to the incoming data. Phase-lock techniques have the disadvantage of requiring many clock cycles to establish synchronization resulting in data being lost during the synchronization process.

U.S. Pat. No. 4,012,598 describes a receiver with a synchronizer which operates by selecting synchronized samples of a digital signal making use of a tap delay line. The most recent samples of the post signals are then stored and synchronized samples are detected by decoding sequence transitions.

U.S. Pat. No. 4,088,833 describes another multiphase sampling device used as a carrier detector in a multipoint communication system. A tapped delay line is used together with an amplitude difference decision circuit for providing an indication that the data signal has been received.

U.S. Pat. No. 3,602,826 describes an apparatus for detecting signal level variations in the presence of noise or other background phenomena. The signals are sequentially sampled according to a predetermined scanning sequence and processed in parallel channels on a synchronized element by element basis to derive an amplitude representation of the level variations occurring over maximum and minimum time intervals. These amplitude representations are then compared as an indication of whether they represent actual information signal or simply noise.

Other pertinent patents include U.S. Pat. Nos. 3,502,905; 3,602,826; 3,716,780; and 4,007,330.

Each of these prior art techniques generally have disadvantages: U.S. Pat. No. 4,012,598 does not provide integration thereby making the system sensitive to noise. U.S. Pat. No. 3,864,583 provides integration but does not address the problem of establishing clock data synchronization. U.S. Pat. Nos. 4,088,833 and 3,602,826 pertains to determining if a singal is present and does not address the problem of determining the information content contained in the signal.

SUMMARY OF THE INVENTION

Briefly, and in general terms, the invention provides a digital signal synchronization system comprising a digital signal source for supplying an input digital signal, a plurality of substantially idential integrating circuits, each connected to the digital signal source for integrating the signal for a predetermined time. The invention further provides a plurality of clock sources, each connected to a corresponding one of the integrating circuits so that each integrating circuit begins integrating the digital signal at a different time, and decision means connected to the output of each of the integrating circuits for selecting one of the integrating circuits according to a predetermined criteria.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF PREFERRED EMBODIMENT

Figure 1A:
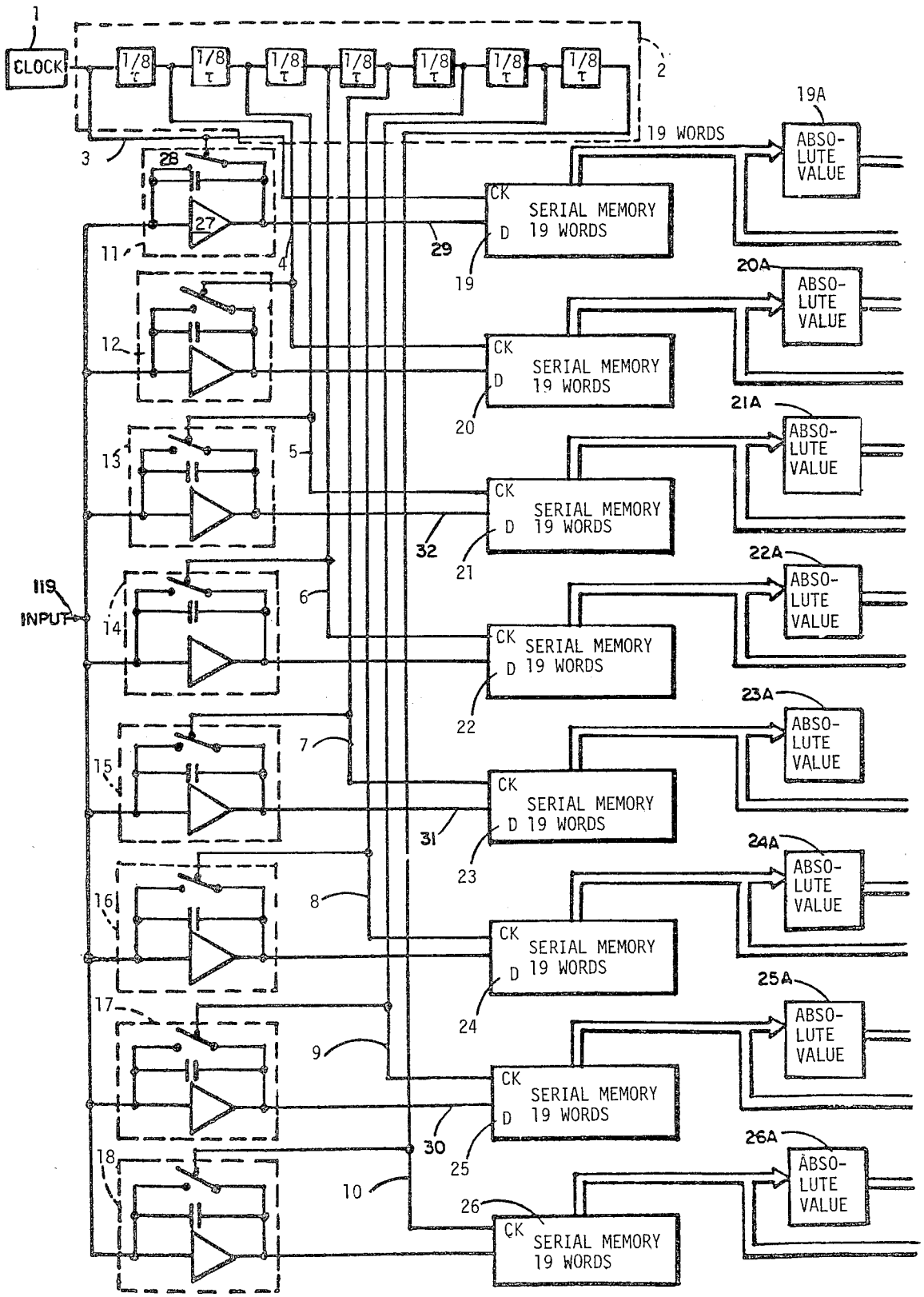
FIGS. 1a and b is a highly simplified block diagram of a first embodiment of the digital signal synchronization system according to the present invention.
Figure 1B:
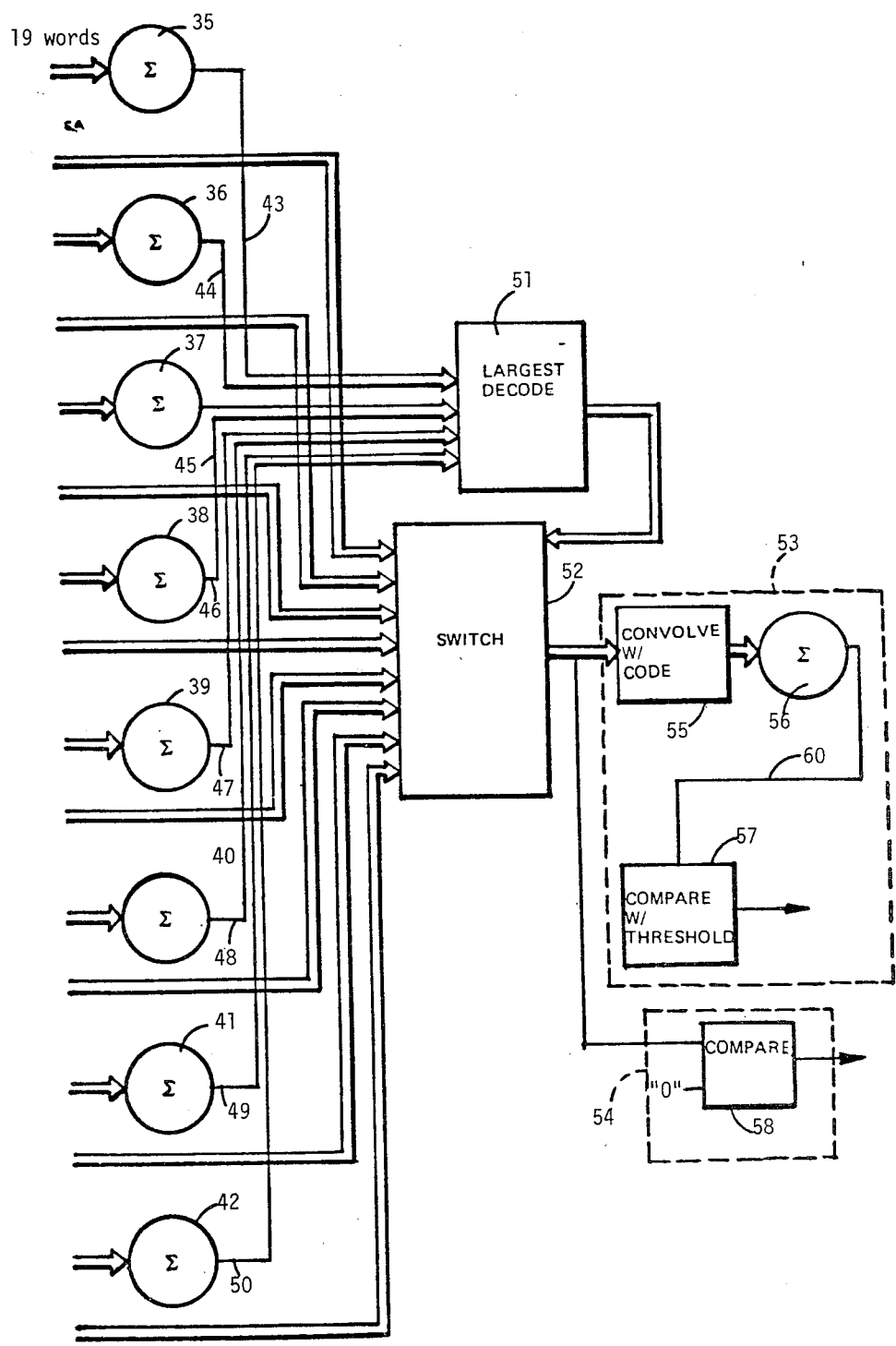

Turning now to FIG. 1, consisting of sheets 1a and 1b, there is shown a block diagram of a first embodiment of the synchronization system according to the present invention. There is shown a clock 1 operated at near the incoming data clock rate at the input 119. The delay line 2 is connected to the clock 1 and provides eight distinct clock phases that equally divide the clock period as shown in FIG. 2.

Figure 2:
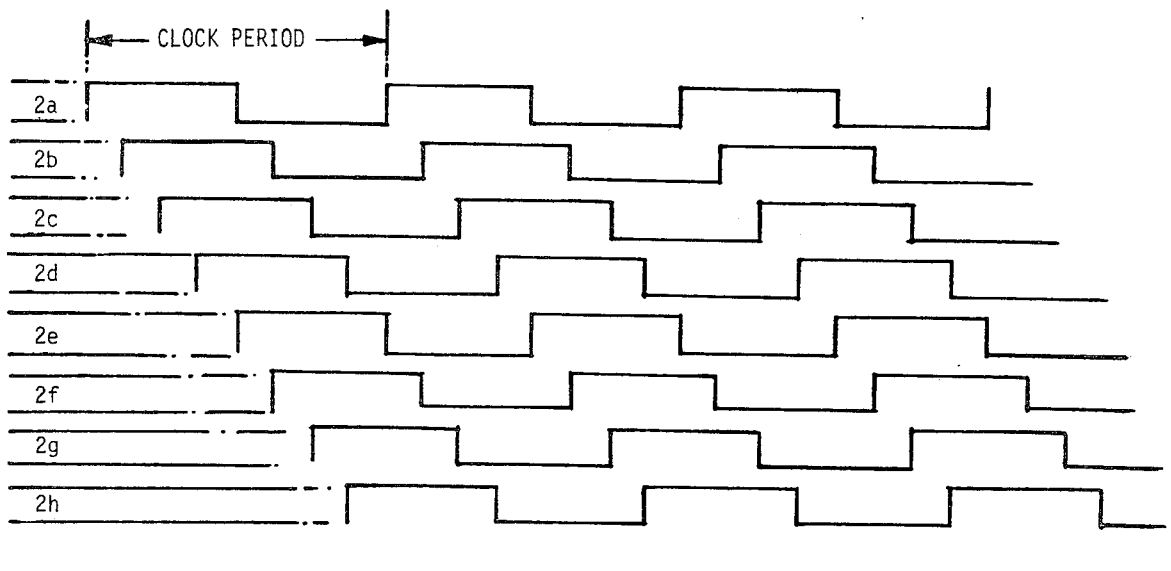
FIG. 2 is a timing diagram of a clock signal associated with the synchronizing system shown in FIG. 1.

FIG. 2 shows the timing diagram of the clock and all of its resulting phases (FIGS. 2a–2b) from the output of the delay line 2. Each of these clock signals is connected to and synchronizes a corresponding matched filter 11–18, shown in FIG. 1.

A matched filter such as the filter 11 consists of an integrator 27 and a discharge switch 28. Each integrator integrates the incoming noisy data from the input 119 for the duration of one clock period. At the end of each clock phase (FIGS. 2a–2h), the integrator is discharged and the value of the integrator just prior to being discharged is transferred to the D input of a corresponding serial memory 19–26, respectively. The data in the respective serial memory is shifted one word when the integrator transfer occurs.

Figure 3:
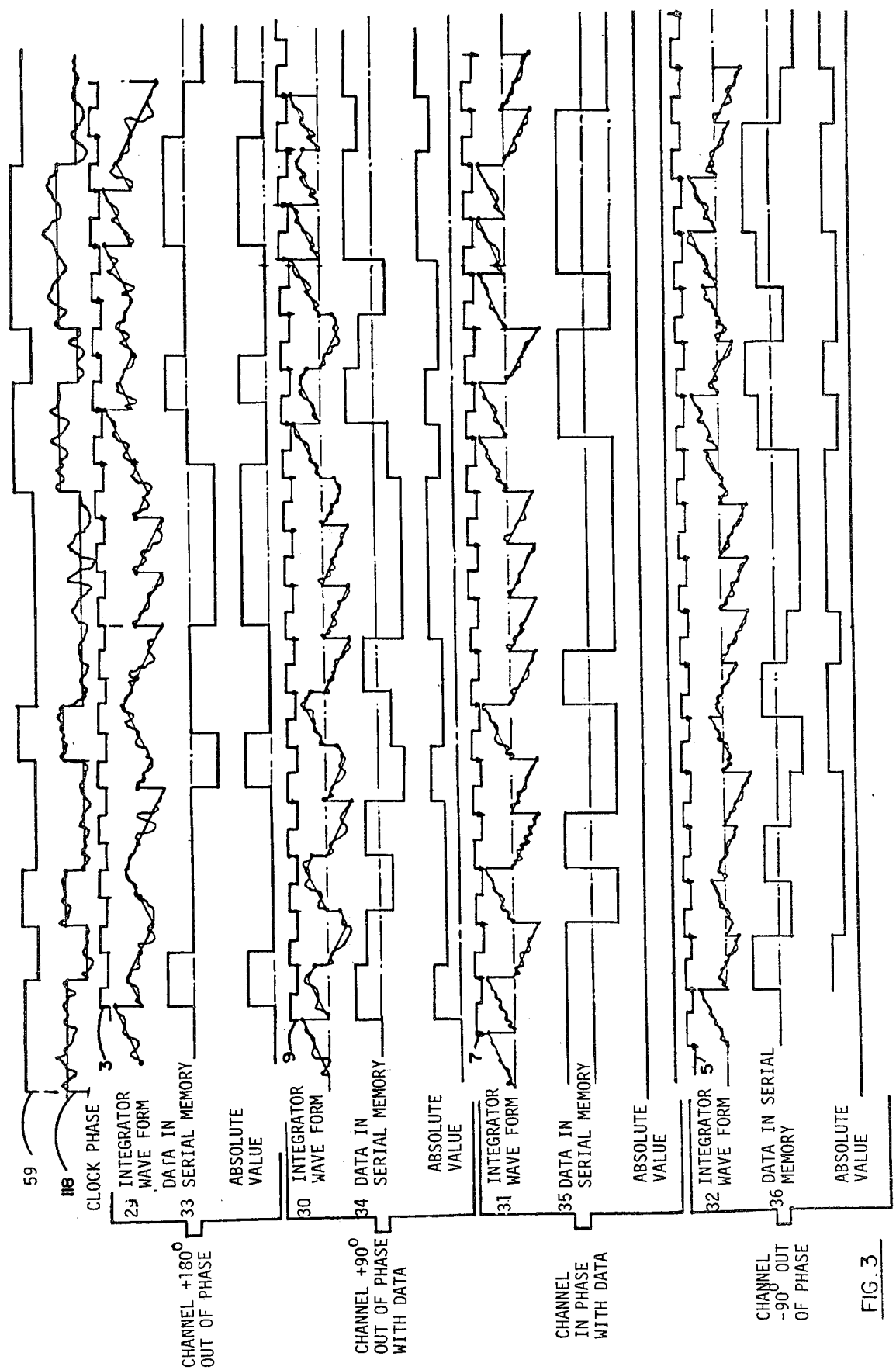
FIG. 3 is a highly simplified diagram of the waveforms associated with the integrators shown in FIG. 1.

FIG. 3 is a highly simplified diagram of the waveforms associated with the integrators shown in FIG. 1. FIG. 3 shows waveforms 29 through 32 which are typical waveforms for the output of integrators 11, 17, 15, and 13 respectively.

The top series of waveforms shows a predetermined digital code word represented by waveform 59, and the noisy data 118 superimposed over the waveform 59. The noisy data 118 is applied to the data input 119. Each of the subsequent blocks of waveforms shows a clock phase, the waveform applied to the integrator, the data which is stored in the serial memory, and the absolute value derived from the data stored in the serial memory. The first block of waveforms shows the data corresponding to the output of integrator 11, which is a channel 180° out of phase with the data clock. The next block of waveforms corresponds to the output of integrator 17 and illustrates a channel 90° out of phase with the data. The next block corresponds to the output of integrator 15 and corresponds to a channel in phase with the data. The last block of waveforms shown in FIG. 3 is associated with the output of integrator 13 and illustrates a channel minus 90° out of phase with the data. The signals actually transferred to the serial memories 19, 25, 23, and 21 are shown as waveforms 33–36 respectively.

The output of serial memories 19–26 are connected to absolute value circuits 19A–26A respectively. The absolute values of the words stored in the serial memories 19, 25, 23, and 21 are computed by absolute value circuits 19A, 25A, 23A, and 21A respectively. The sum of the absolute values of each of the words in each of the memories is computed by circuits 35–42 for each serial memory.

Figure 4:
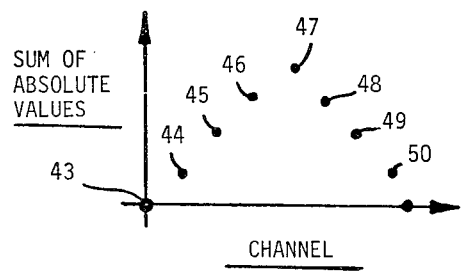
FIG. 4 is a graph showing the output of the summing circuits shown in FIG. 1b.

FIG. 4 shows the value of the sum of absolute values for each channel. Sum 47 is the largest and coincides with the channel with the best synchronized clock phase (phase 5).

The largest decode circuit 51 determines the largest sum of absolute values. The largest decode circuit directs switch 52 to connect the channel with the largest absolute value to the decoder circuits 53.

The decoder circuit shown in 53 will detect the presence of a digital code word such as waveform 59 shown in FIG. 3 in the noisy data such as represented by waveform 118. The circuit 53 consists of a convolution circuit 55, a summer circuit 56, and a threshold circuit 57. The convolution circuit 55 is connected to the switch 52 and processes each word in the selected serial memory with respect to the expected digital code word. If the expected digital code bit is a logical "1" the serial memory word is multiplied by +1 and added to the summer 56. If the code bit is a "0", then the serial memory word is multiplied by −1 and added to the summer device 56. The summer 56 accumulates the sum of each word in the selected serial memory in this manner. The sum 60 is then compared to a detection threshold in circuit 57. If the sum is greater than the threshold, then the code word is said to have been found in the noisy data 118.

An alternative detection circuit 54 can also be used to detect digital data of waveform 118 one bit at a time. This detector compares the data with the last word in the serial memory using a comparator circuit 58. If that word is greater than the threshold, the data is said to be a logical "one" and if it is less than the threshold, it is said to be logical "zero".

Figure 5A:
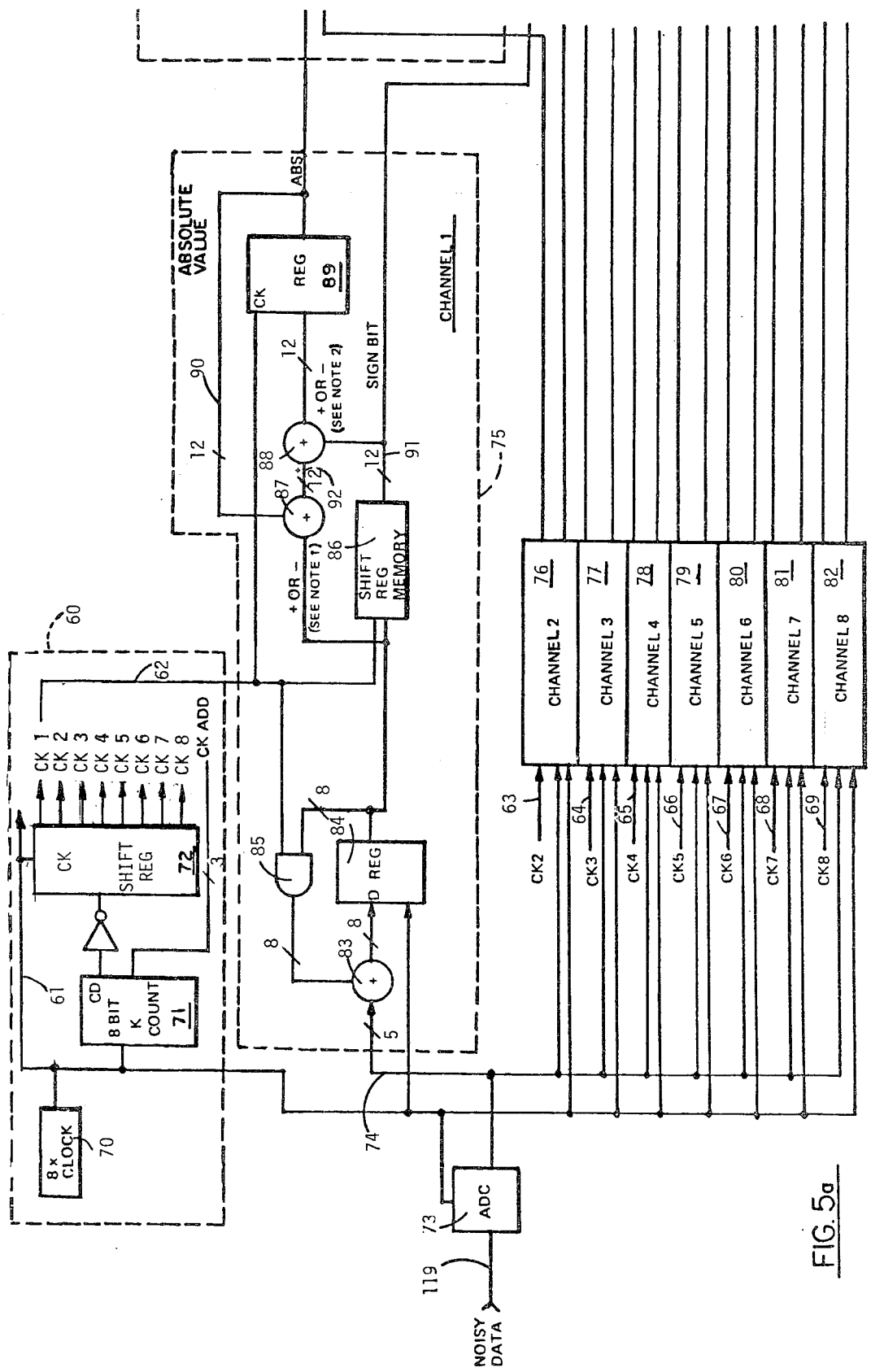
FIGS. 5a and b is a detailed block diagram of a second embodiment of the present invention.
Figure 5B:
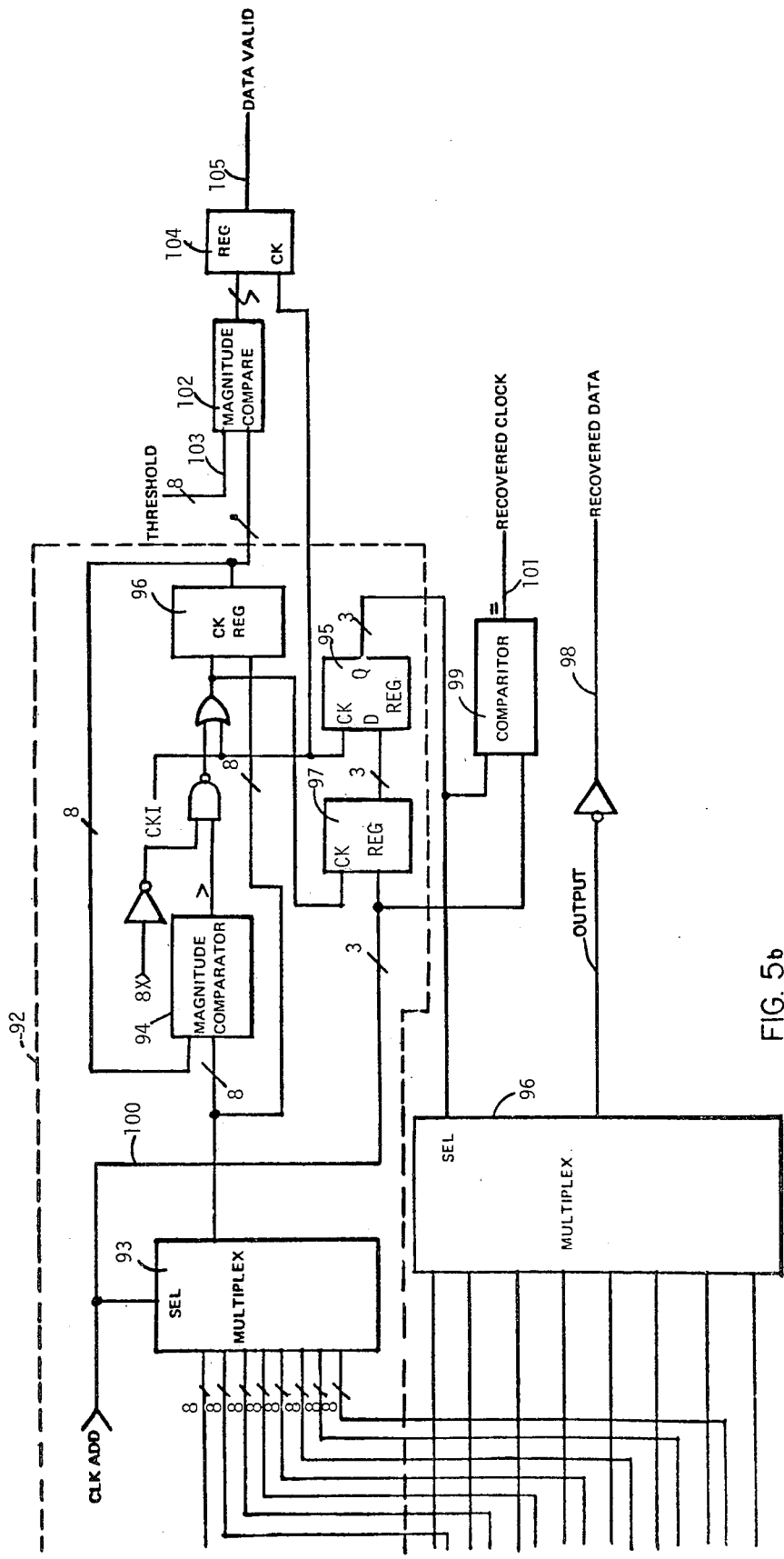

Turning now to FIGS. 5a and b, there is shown a hardware block diagram of a second embodiment of the present invention.

Figure 6:
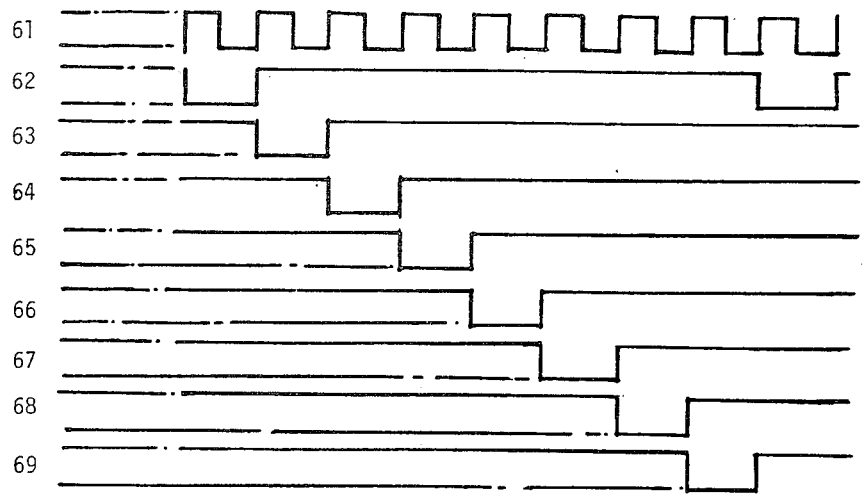
FIG. 6 is a timing diagram of the clock signal associated with the synchronizing system shown in FIG. 5.

The multiphase clock generator 60 is another embodiment of the circuit described by reference numeral 2 in FIG. 1. The 8x clock circuit 70 generates a clock 61 at eight times the frequency of the incoming data rate. Counter 71 overflows once every eight clock cycles. The counter overflow is shifted into shift register 72. Shift register 72 is clocked with the eight times clock frequency 61 thus producing the multiphase clock shown in FIG. 6. The first clock phase signal is applied to line 62.

The noisy data input 119 is applied to and digitized by the analog to digital converter (ADC) 73. The output of the ADC, the data on line 74, represents a sampled version of the data on input line 119. The sampled data on line 74 is then presented to each of the eight processing channels 75 through 82 simultaneously. Each of the channels 75–82 is essentially the same and is typified by the circuit forming channel 1 and shown in detail in FIG. 5a in block 75.

Data on line 74 is added to the contents of register 84 with adder 83 on each cycle of the eight times clock, thus integrating the digitized waveform. When channel reset time occurs, indicated by a low pulse on line 62, the feedback from register 84 to adder 83 is disabled by gate 85, so that the register 84 is loaded with data on line 74 resulting in an integrator reset. When the integrator is reset, the contents of register 84 is clocked into shit register 86. The clock on line 62 causes the contents of shift register 86 to be shifted one word.

Adders 87 and 88 and register 89 compute and save the sum of the absolute values of the data in shift register 86. Adder 87 adds the absolute value of the new data from register 84 to the data in register 89 while adder 88 substracts the absolute value of the last word of data in shift register 86, thus register 89 contains the sum of the absolute values of the data in shift register 86. Adder 87 adds the data from register 84 to the data on line 90 if the data from register 84 has a positive sign, or subtracts the data from register 84 from the data on line 90 if the data from register 84 has a negative sign. Thus the absolute value of the data from register 84 is always added to line 90. Adder 88 subtracts the data on line 91 from the data on the lines 92 if the data on the lines 91 is positive. Alternatively, adder 88 adds the data on lines 91 if the data on lines 91 is negative. Thus adder 88 always subtracts the absolute value of the data on line 91.

The output of processing channel 75 is connected to circuit 92. The circuit 92 functions to find the best synchronized channel by finding the channel with the largest absolute value. The address of the best synchronzied channel is stored in register 95. Register 96 contains the absolute value of the data associated with the channel stored in register 95.

The operation of circuit 92 begins at clock time one when register 96 is loaded with the absolute value of the data on channel 1 and register 97 is loaded with the address channel "one". On the next cycle of the 8x, clock multiplexer 93 connects channel 2 to the magnitude comparator 94. If channel-2 has a larger absolute value than is stored in register 96, the comparator 94 causes the absolute value of channel-2 to be stored in register 96 and address "two" to be stored in register 97. In a similar manner channels 3 through 8 are compared.

After clock eight, register 96 contains the absolute value of the best synchronized channel. The contents of register 97 are transferred to register 95 before register 97 is reset for the next cycle, thus register 95 contains the address of the best channel through the next cycle.

The register 95 directs multiplexer 96 as to which channel to connect to the output data line "output". If the sign bit of the last word in the shift register of the best synchronized channel is a one indicating a negative number in 2's complement notation, then the detected data is said to be a logical "zero" and if the sign bit is a zero indicating a positive number in 2's complement notation, then the detected data is said to be a logical "one".

Comparator 99 compares the best channel address contained in register 95 with the current clock address line 100. When a comparison occurs in comparator 99, a recovered clock pulse is generated on line 101.

Magnitude comparator 102 compares the magnitude of the absolute value of the best channel contained in register 96 with a predetermind magnitude indicative of data being received. If the magnitude of the absolute value is greater than the predetermined magnitude on line 103, register 104 is set indicating valid data is contained in the channel indicated by register 95.

Figure 7:
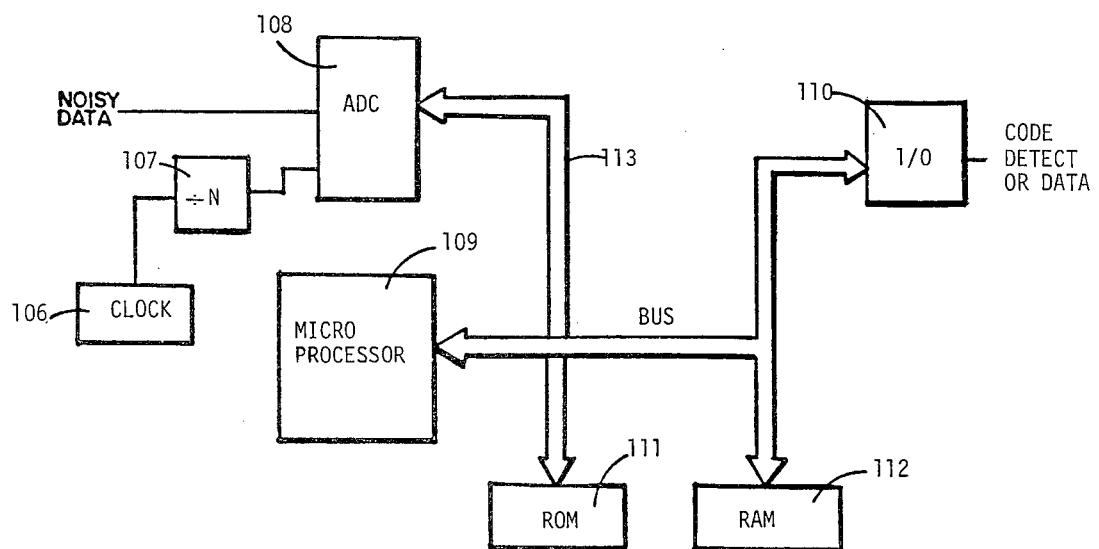
FIG. 7 is a block diagram of the third embodiment of the present invention.
Figure 8:
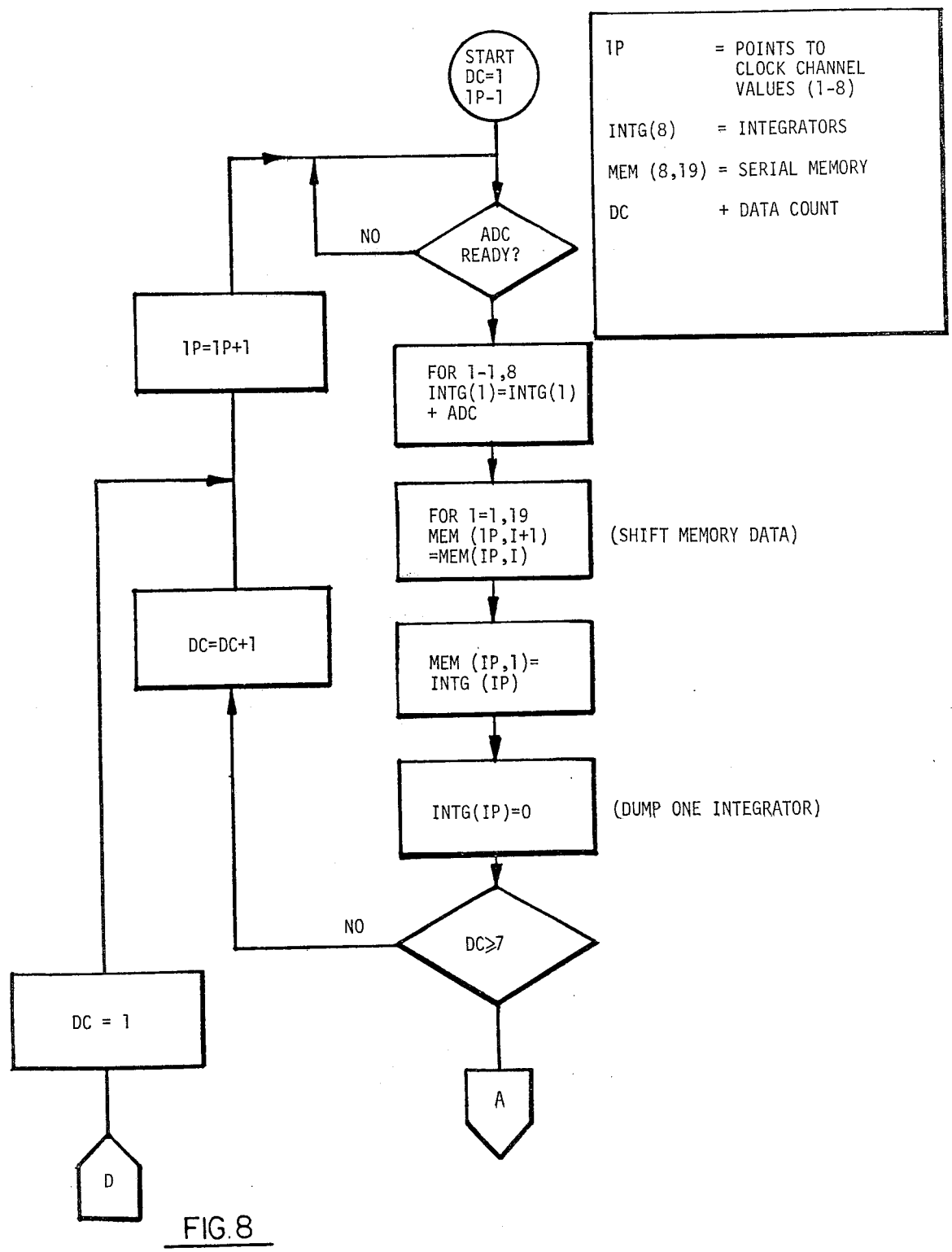
FIGS. 8–11 are flow-charts of the program used for the microprocessor in the embodiment of FIG. 7.
Figure 9:
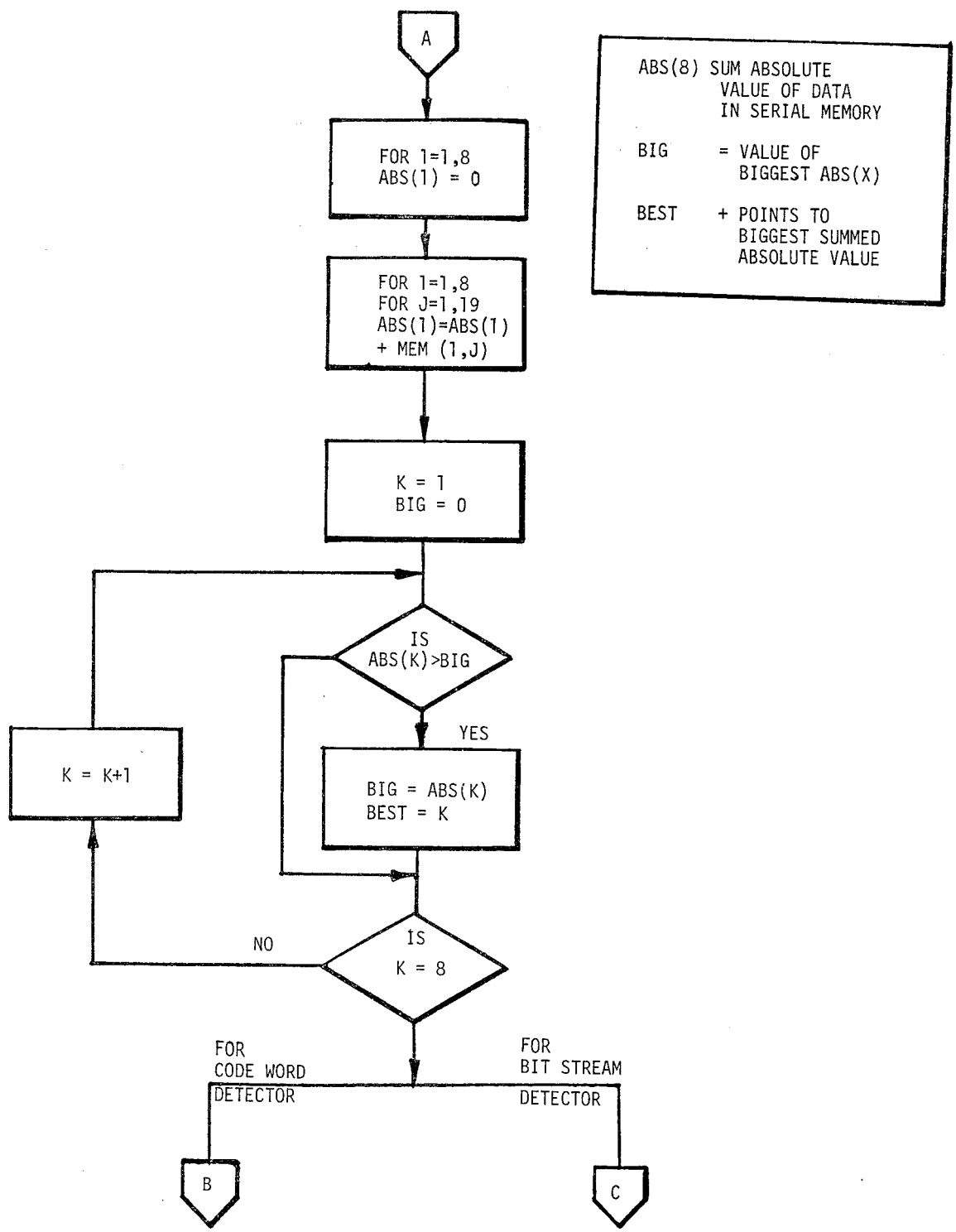
Figure 10:
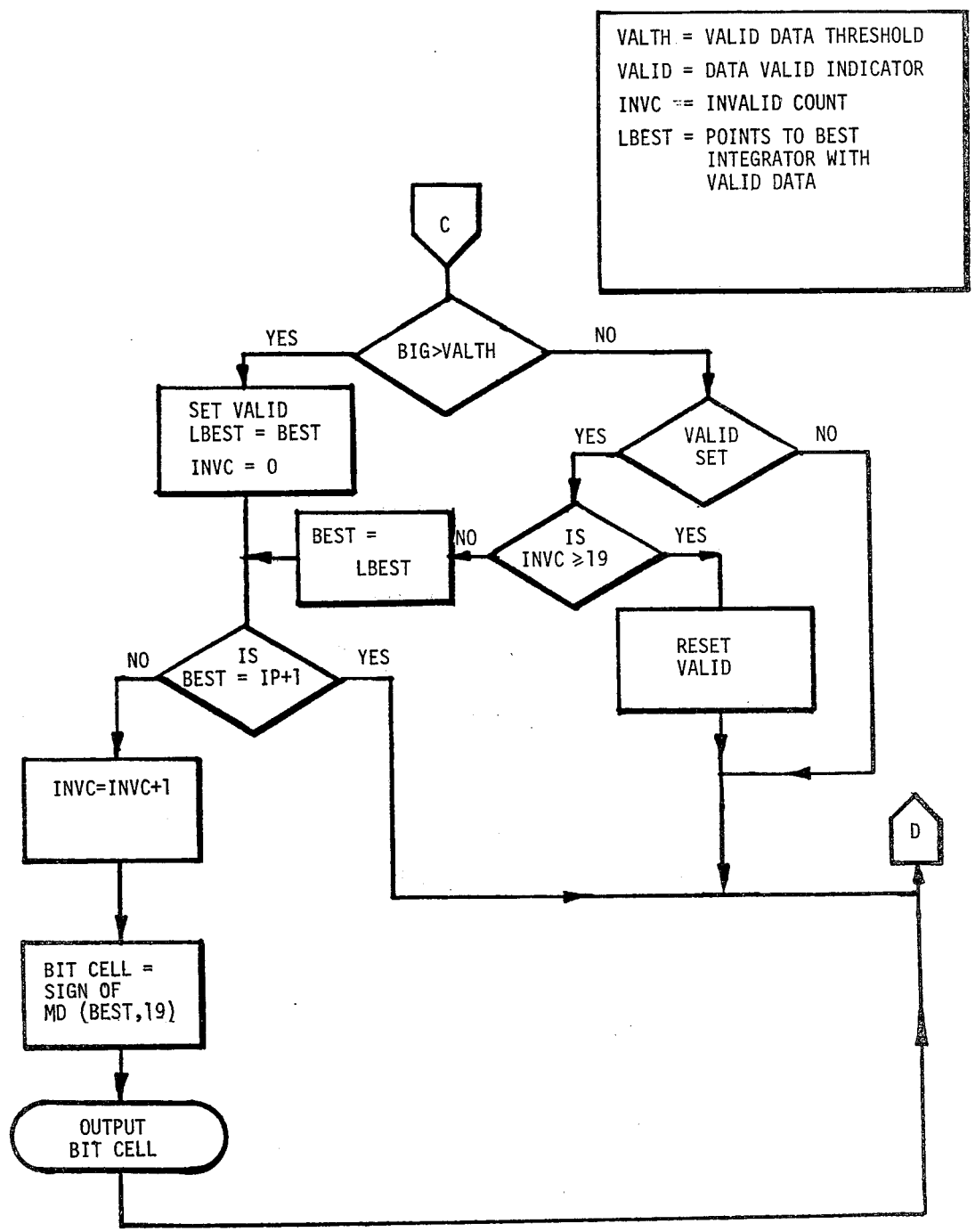
Figure 11:
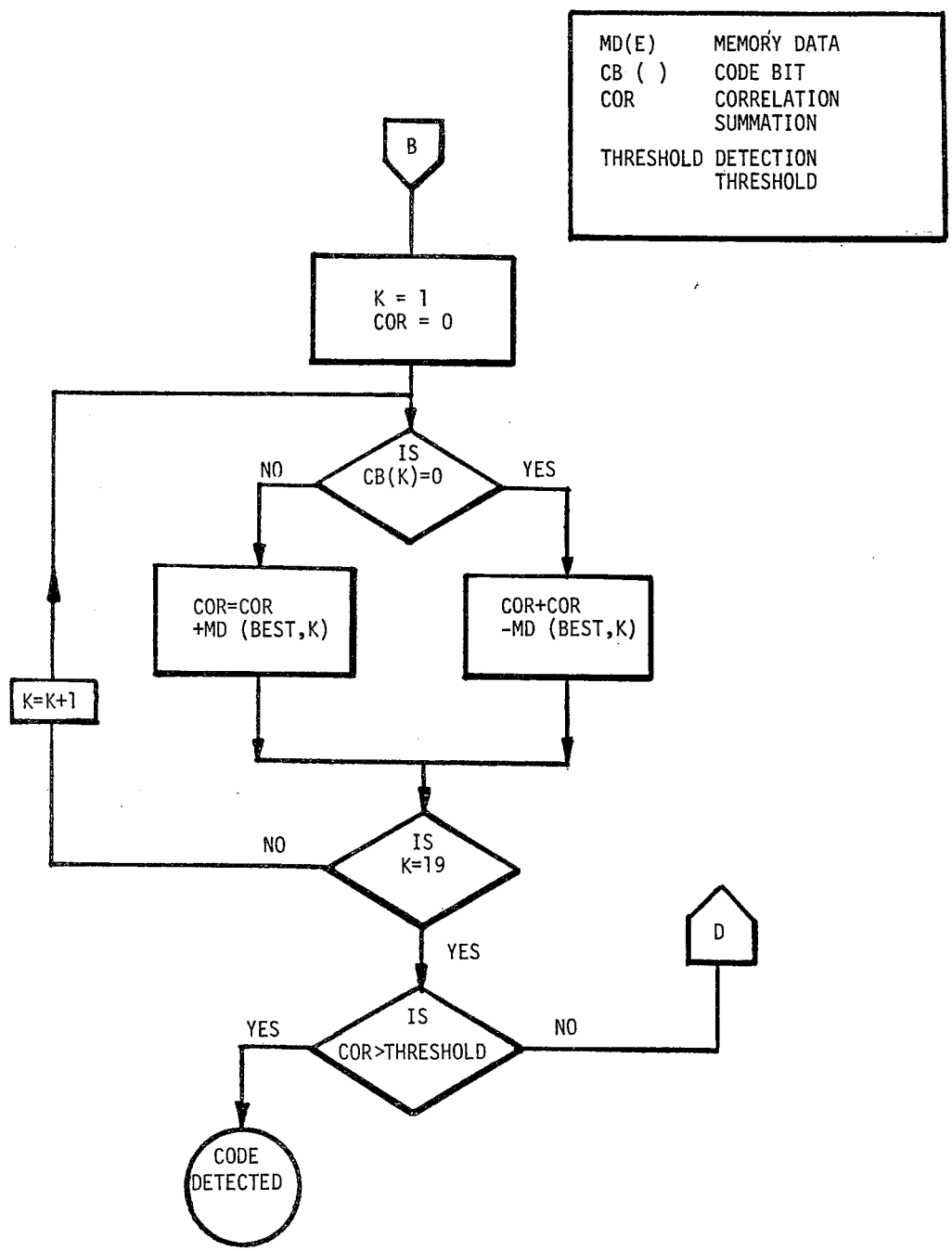

FIG. 7 is a third embodiment of the present invention using a microprocessor 109. The flow chart describing the operation is shown in FIGS. 8-11. The implementation shown can either detect a code word in the input noisy data or decode a digital data stream.

The analog-to-digital converter (ADC) 108 is operated at a sample rate of eight times the expected incoming data rate. The sample rate clock is achieved by dividing the clock 106 with the divide by N circuit 107. The ADC is connected to the microprocessor bus 113. This connection allows the microprocessor to read the digitized noisy data.

The read only memory (ROM) 111 connected to the microprocessor bus contains the program shown in FIGS. 8-11. The random access memory 112 also connected to the bus, is used by the microprocessor for variable data storage. The input-output device (I/O), 110 is used to indicate the bit stream or the presence of the code word in the noisy data.

The program for operating the microprocessor 109 is shown in the flow chart FIGS. 8-11, and is self-explanatory.

In summary, the present invention allows the use of a matched filter detection scheme for short sequence of noisy data which could be associated with teletype, telemetry-transmissions where it is important to receive all data bits transmitted.

Prior to the present invention phase-lock techniques were used for clock synchronization when integrated and dump matched filters were used to detect noisy digital data. Phase-lock techniques have an inherent disadvantage of requiring several clock cycles to establish synchronization. The present invention circumvents this disadvantage and allows for the detection of all data bits.

The present invention may be used to detect many forms of digital signals, where the signal takes on two distinct states and may contain additive noise. The integration incorporated in the present invention decreases the influence of additive noise resulting in an increase in detection sensitivity. The storage of the multi-integrate and dump matched filter prevents the loss of data during the synchronization interval normally associated with phase-lock techniques.

While the invention has been illustrated and described as embodied in a synchronization system for digital data, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt if for various applications without omitting features that, from the standpoint of prior art, fairly constitutes essential characteristics of the generic or specific aspects of this invention, and, therefore, such adaptations should and are intended to applying current knowledge, readily adapt it for various applications without omitting features that, from the standpoint of prior art, fairly constitutes essential characteristics of the generic or specific aspects of this invention, and, therefore, such adaptations should and are intended to be comprehended within the meaning and range of equivalence of the following claims.

What is claimed is:

1. A digital signal synchronization system comprising:
    a signal source for supplying an input signal;
    an analog to digital converter having an input connected to said signal source; and an output;
    a plurality of substantially identical summing circuits each connected to said output of said analog to digital converter for summing a plurality of successive signals for a predetermined time;
    a plurality of clock sources each connected to a corresponding one of said summing circuits so that each summing circuit begins summing said digital signal beginning at a different time; and
    decision means connected to the output of each of said summing circuits for selecting one of said summing circuits according to a predetermined criteria, so that said clock signal associated with said one of said summing circuits is selected as the synchronized clock signal associated with said input signal.

2. A system as defined in claim 1, wherein said decision means functions to select said one of said summing circuits having the output with the greatest absolute value.

3. A system as defined in claim 1, when said summing circuits comprises an adder and a shifter register memory.

4. A system as defined in claim 1, wherein each of said clock sources has a frequency identical with the digital data rate of the input signal.

5. A system as defined in claim 1, wherein each of said clock sources has a different phase.

6. A digital signal synchronization system comprising:
    a signal source for supplying an input signal;
    an analog to digital converter having an input connected to said signal source; and an output;
    a plurality of substantially identical summing circuits each connected to said output of said analog to digital convertor for summing a plurality of successive signals for a predetermined time;
    a plurality of clock sources each connected to a corresponding one of said summing circuits so that each summing circuit begins summing said digital signal beginning at a different time;

decision means connected to the output of each of said summing circuits for selecting one of said summing circuits according to a predetermined criteria so that said clock signal associated with said one of said summing circuits is selected as the synchronized clock signal associated with said input signal; and said summing circuits comprise an adder and a shift register memory.

7. A system as defined in claim 6, wherein said clock signal associated with said one of said summing circuits is selected as the synchronized clock signal associated with said input signal.

8. A system as defined in claim 6, wherein each of said clock sources has a frequency identical with the digital data rate of the input signal.

9. A system as defined in claim 6, wherein each of said clock sources has a different phase.

10. A digital signal synchronization system comprising:

a digital signal source for supplying an input digital signal;

a plurality of substantially identical integrating circuits each connected to said digital signal source for integrating the signal for a predetermined time;

a plurality of clock sources each connected to a corresponding one of said integrating circuits so that each integrating circuit begins integrating said digital signal at a different time; and decision means connected to the output of each of said integrating circuits for selecting one of said integrating circuits such that said clock signal associated with said one of said integrating circuits is the synchronized clock signal associated with said input digital signal.

11. A system as defined in claim 10, wherein said decision means functions to select said one of said integrating circuits having the output with the greatest absolute value.

12. A system as defined in claim 10, when said integrating circuits comprises integrate and dump matched filters.

13. A system as defined in claim 10, wherein each of said clock sources has a frequency identical with the data rate of the input digital signal.

14. A system as defined in claim 10, wherein each of said clock sources has a different phase.

15. A system as defined in claim 10, further comprising convolving means connected to the output of said selected one of said integrating circuits for computing a convolution function signal using the output signal on said output.

16. A system as defined in claim 10, further comprising threshold detection means connected to the output of said selected one of said integrating circuits for sensing the output signal on said output and producing an activating signal if the magnitude of said output signal exceeds a predetermined threshold signal magnitude.

17. A system as defined in claim 10, wherein said integrating circuit comprises a serial memory for storing a plurality of words in information representing the successive integrations of said input signal.

* * * * *

UNITED STATES PATENT AND TRADEMARK OFFICE
CERTIFICATE OF CORRECTION

PATENT NO. : 4,328,588
DATED : May 4, 1982
INVENTOR(S) : Richard A. Smithson

It is certified that error appears in the above–identified patent and that said Letters Patent are hereby corrected as shown below:

In column 4, line 32, please delete "shit" and insert --shift--.

Signed and Sealed this

Twenty-seventh Day of July 1982

[SEAL]

Attest:

Attesting Officer

GERALD J. MOSSINGHOFF

Commissioner of Patents and Trademarks